(12) United States Patent
Parry

(10) Patent No.: US 6,828,960 B2
(45) Date of Patent: Dec. 7, 2004

(54) ELECTRONIC WRITING INSTRUMENT WITH FINGERPRINT SCANNER

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 09/967,077

(22) Filed: Sep. 28, 2001

(65) Prior Publication Data

US 2003/0062202 A1 Apr. 3, 2003

(51) Int. Cl.⁷ .................................................. G09G 5/00
(52) U.S. Cl. .................... 345/179; 345/169; 178/18.01; 382/124
(58) Field of Search ................................. 345/179, 169, 345/173, 157; 178/18.01; 235/380; 380/200, 216; 382/124, 116, 125, 126, 127; 709/203, 217, 229; 713/168; 250/221; 350/221–1

(56) References Cited

U.S. PATENT DOCUMENTS

| | | | | |
|---|---|---|---|---|
| 5,869,822 A | * | 2/1999 | Meadows et al. | 235/380 |
| 6,002,499 A | * | 12/1999 | Corboline et al. | 359/2 |
| 6,069,969 A | * | 5/2000 | Keagy et al. | 382/124 |
| 6,304,907 B1 | * | 10/2001 | Keronen et al. | 709/229 |
| 6,417,845 B1 | * | 7/2002 | Chen et al. | 345/173 |
| 6,539,101 B1 | * | 3/2003 | Black | 382/124 |
| 6,627,870 B1 | * | 9/2003 | Lapstun et al. | 250/221 |
| 2001/0055411 A1 | * | 12/2001 | Black | 382/124 |
| 2002/0081005 A1 | * | 6/2002 | Black | 382/124 |
| 2002/0122026 A1 | * | 9/2002 | Bergstrom | 345/157 |

* cited by examiner

Primary Examiner—Nick Corsaro
Assistant Examiner—Shaima Q Aminzay

(57) ABSTRACT

An electronic writing instrument includes a finger pad that supports a user's finger when the user is using the writing instrument. The user's finger rests on the finger pad in such a way that a fingerprint of the user's finger can be scanned by a fingerprint scanner located in the writing instrument to obtain fingerprint data. The fingerprint data is transmitted to a computing device where the fingerprint data is converted into a private key code. Alternatively, the fingerprint data is converted into the private key code in the writing instrument and the private key code is transmitted to the computing device. The transmission may be through a wired or wireless link. The private key code is used to create a public key code, which is incorporated into an electronic signature. The electronic signature may then be affixed to an electronic document to verify that the user signed the document.

29 Claims, 3 Drawing Sheets

ELECTRONIC WRITING INSTRUMENT WITH FINGERPRINT SCANNER

TECHNICAL FIELD

This invention generally relates to electronic signatures and, more particularly, to an electronic writing instrument having a fingerprint scanner incorporated therein, wherein fingerprint data obtained by the fingerprint scanner is used to create an electronic signature.

BACKGROUND

As enterprises move from paper-based systems to more economical paperless environments, new barriers are presented that must be overcome with new technology. Business transactions, agreements and authorizations are some examples of events that require one or more person's assent, evidenced by that person's signature, that must be electronically perpetuated in a paperless system. Perpetuation is required to maintain the commercial quality of permanence that is required to support audit, evidentiary and enforcement requirements.

In October 2000, the federal Electronic Signatures in Global and National Commerce Act (also known as "E-Sign") was enacted. The new law broadly authorizes electronic records and electronic signatures as being legally effective. The existence of this new law makes business transactions conducted electronically easier to enforce. Therefore, a major barrier for conducting electronic business transactions has been removed, and greater proliferation of electronic business transactions will no doubt be seen in the marketplace.

Typically, electronic signatures are applied to electronic documents within a user's computer. After the electronic signature is appended to an electronic document, the electronic document is electronically transmitted to another computer, where the electronic document may be processed further or stored.

While many solutions have been found to store and process electronic documents with electronic signatures, problems still exist because many business transactions, although conducted electronically, still require a user to physically affix a user signature to a document, either an electronic document or a paper document. Translating a physical signature into an electronic signature and incorporating uniquely identifying features into the physical signature so it can be used to verify documents presents new problems to overcome.

SUMMARY

Systems and methods are described herein for scanning a fingerprint to use in uniquely identifying a handwritten signature. An electronic writing instrument includes a finger pad on which a user's finger rests when the user is writing with the electronic writing instrument. A fingerprint scanner located in the writing instrument is configured to scan a fingerprint of the user that rests on the finger pad. A feature identifier is configured to identify particular features of the scanned fingerprint.

The fingerprint features are converted into a code, specifically, a private key code. Since the fingerprint is unique to the user, the private key code derived from the fingerprint is also unique to the user. Therefore, the private key code may be used to uniquely identify the user. A public key code is derived from the private key by some known method, e.g., encrypting the private key code with a previously selected password.

The public key code is then transmitted to a computing device, either via a wired or a wireless link. In one implementation, the data obtained from the fingerprint scanner is transmitted to the computing device, where the data is converted into a private key code and the public key code is created.

The electronic writing instrument is designed to capture the fingerprint data as the user signs the user's signature. The signature may be signed on paper (or some similar medium) or electronically (on an electronic signature pad, a touch screen, etc.) If the signature is signed on paper, then the paper document is scanned into the computing device.

An electronic signature module in the computing device creates an electronic signature from the public key code and attaches the electronic signature to the document. In one implementation, a digital representation of the signature is stored with the document in the appropriate location. Thereafter, the electronic signature may be used to verify that the person identified by the electronic signature signed the document, and that the document has not been changed since it was signed.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
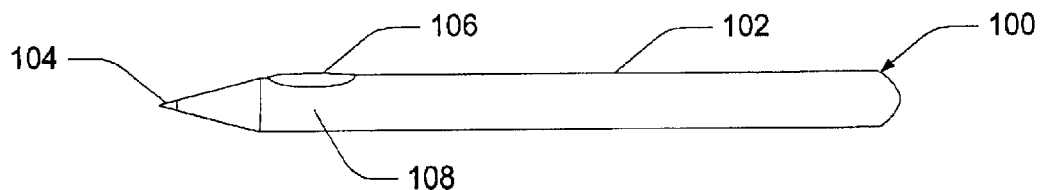
FIG. 1 is an illustration of an electronic writing instrument that incorporates a fingerprint scanner.

The following description sets forth one or more specific implementations and/or embodiments of an electronic writing instrument with a fingerprint scanner and methods use with electronic signatures. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of an electronic writing instrument with a fingerprint scanner and methods use with electronic signatures. Applicant intends these exemplary implementations to be examples only. Applicant does not intend these exemplary implementations to limit the scope of the claimed present invention(s). Rather, Applicant has contemplated that the claimed present invention(s) might also be embodied and implemented in other ways, in conjunction with other present or future technologies.

Computer-Executable Instructions

An implementation of an electronic writing instrument with a fingerprint scanner and/or method for use with electronic signatures may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of an electronic writing instrument with a fingerprint scanner and/or methods of use with electronic signatures may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Exemplary Electronic Writing Instrument

FIG. 1 is an illustration of an electronic writing instrument 100 configured for use with electronic signatures. The electronic writing instrument 100 includes a body 102 and has a nib 104 at an end of the body 102. The nib 104 may simply be a narrowed, or pointed, end of the body 102, or the nib 104 may be a ball in the event that the electronic writing instrument 100 is a ballpoint pen. Depending on the implementation of the electronic writing instrument 100, the nib 104 may take many different forms.

The electronic writing instrument 100 also includes a finger pad 106 upon which a user's finger (not shown) rests when the user is writing with the electronic writing instrument 100. The finger pad 106 is positioned in such a way that at least a part of a fingerprint portion (not shown) of the user's finger (not shown) lays flat against the finger pad 106. As a result, a fingerprint scanner 108 positioned inside the body 102 of the electronic writing instrument 100 may scan the part of the fingerprint portion of the user's fingerprint. The features and function of the electronic writing instrument 100 will be discussed in greater detail below.

Figure 2:
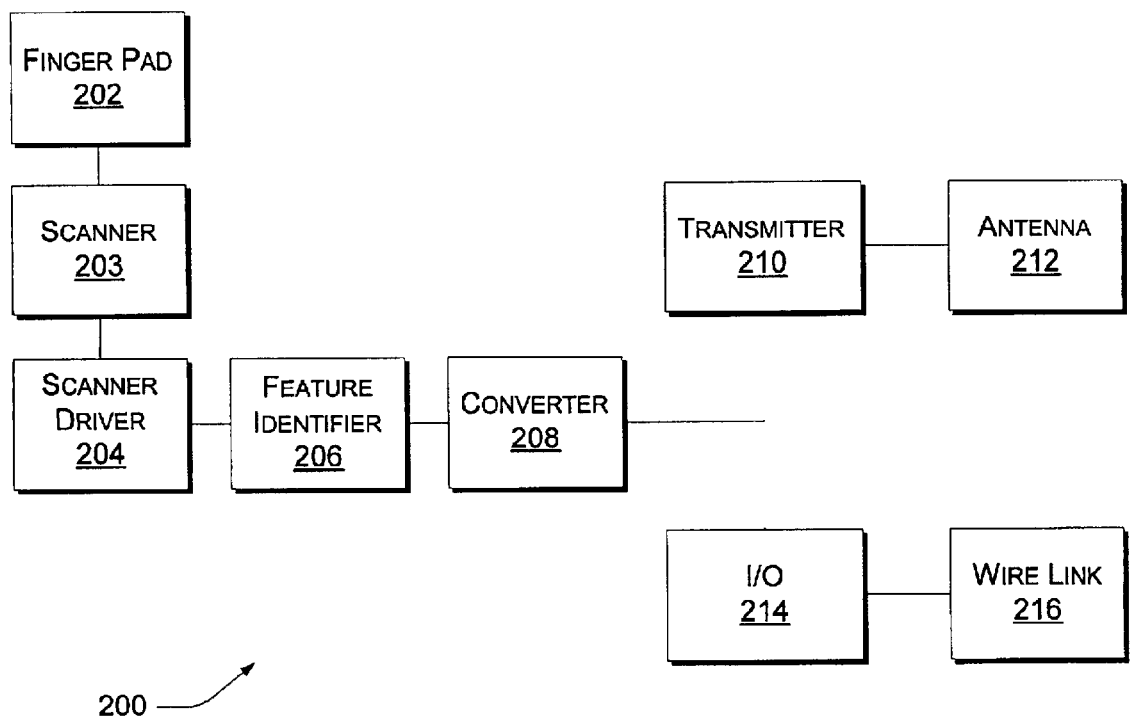
FIG. 2 is a block diagram of an electronic writing instrument that includes a fingerprint scanner.

FIG. 2 is a block diagram of an electronic writing instrument 200 similar to that shown and described in FIG. 1. The electronic writing instrument 200 includes a finger pad 202, a fingerprint scanner 203 and a scanner driver 204. As previously discussed, the finger pad 202 is positioned in such a way that a user's finger rests upon the finger pad 202 when the user is writing with the electronic writing instrument 200.

The fingerprint scanner 203 is integrated with—or closely associated to—the finger pad 202. The fingerprint scanner 203 is configured to scan the finger pad 202 when the user is signing a physical signature with the electronic writing instrument 200. The fingerprint scanner 203 may scan the finger pad 202 during the signing process or approximately contemporaneously thereto. Any timing of the scanning that assures that data received as a result of the scan can be reliably matched to a user and the user's signature may be implemented within the scope of the present invention. The scanner driver 204 includes the software necessary to operate the scanning and the timing of the scanner 203.

The electronic writing instrument 200 also includes a feature identifier 206 and a converter 208. The feature identifier 206 is configured to identify fingerprint data representing select features of a scanned fingerprint, e.g., whorls, vortices, etc. The select features identified by the feature identifier 206 must be sufficient to distinguish one scanned fingerprint from any other scanned fingerprint. In other words, the feature identifier 206 must identify a sufficient number of fingerprint features to uniquely identify a user based on the identified fingerprint features.

The converter 208 is configured to convert the fingerprint data into a private key code that is a code associated with the user that uniquely identifies the user among private key codes of other users derived in the same manner using commonly known fingerprint identification schemes. This could also . . . whorls . . . or arbitrarily assign key and associate For instance, if the fingerprint data 206 represents twenty (20) identified features of a fingerprint, then the private key code may be a twenty-digit number (base 10), each digit representing a certain degree of the fingerprint feature that is associated with the digit. As a practical matter, the private key code must be long enough to uniquely identify a universe of potential users of the electronic writing instrument 200.

The electronic writing instrument 200 also contains, in the alternative, a transmitter 210 and an antenna 212 used by the transmitter 210, or an input/output (I/O) module 214 and a wired ling 216 utilized by the I/O module 214. The specific implementation depends on whether the electronic writing instrument 200 communicates with a computing device (not shown) via a wireless or a wired transmission link. The features and functions shown and described with respect to FIG. 2 will be discussed in greater detail, below, with respect to FIG. 3.

Exemplary Operational Environment

Figure 3:
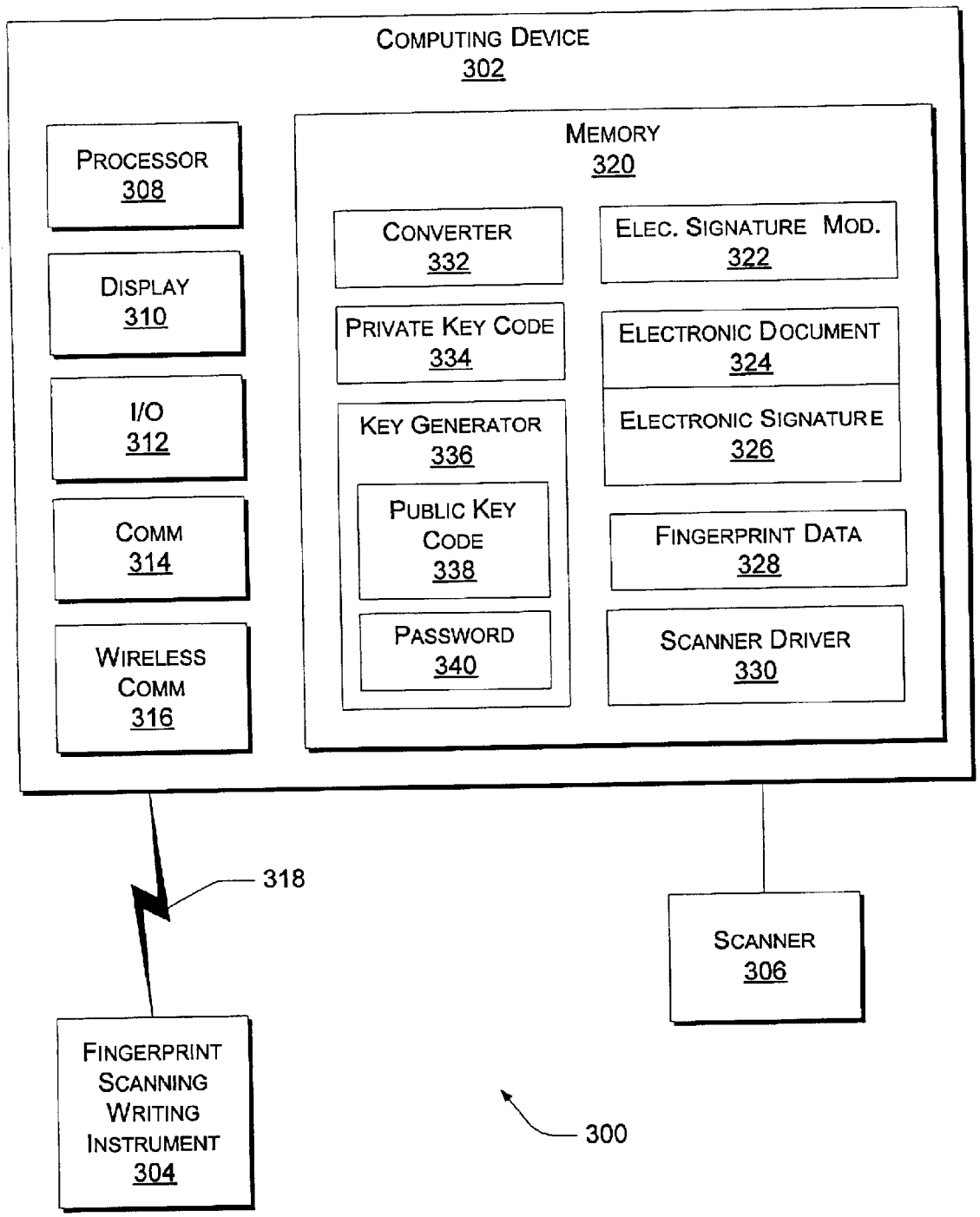
FIG. 3 is a block diagram of an electronic writing instrument that includes a fingerprint scanner and a computing device used with the writing instrument.

FIG. 3 is a block diagram of an exemplary operational environment 300 for an electronic writing instrument that includes a fingerprint scanner for use with electronic signatures.

The operational environment 300 is shown with a computing device 302, a fingerprint scanning writing instrument 304 and a scanner 306. The fingerprint scanning writing instrument 304 is similar to the electronic writing instruments 100, 200 shown in FIGS. 1 and 2, respectively. The scanner 306 is a document scanner that scans paper documents and creates electronic documents that are identical versions of the paper documents.

The computing device 302 includes a processor 308, a display 310, an input/output (I/O) port 312, a communications port 314 and a wireless communications port 316. The wireless communications port 316 is configured to receive data from the fingerprint scanning writing instrument 304 via a wireless link 318, such as a radio frequency (RF) or infrared (IR) signal. It is noted, however, that the fingerprint scanning writing instrument 304 may communicate with the computing device 302 via a wired link (not shown) through the communications port 316.

The computing device 302 also includes memory 320 that stores an electronic signature module 322, an electronic document 324 including an electronic signature 326, fingerprint data 328 and a scanner driver 330 that drives the scanner 306.

The electronic signature module 322 is configured to control functions that manipulate (create, edit, append, delete, verify, etc.) the electronic signature 326 included with the electronic document 324. The fingerprint data 328 is stored in the memory 320 after being received from the fingerprint scanning writing instrument 304.

The memory 320 of the computing device 302 also stores a converter 332, a private key code 334 and a key generator 336. The key generator 336 includes a public key code 338 and a password 340. It is noted that all the elements shown stored in the memory 320 may not all be present in the 110 memory 320 at any given time. Rather, some elements in the memory 320 are not initially present, but are created and subsequently stored in the memory 320. These elements will be identified and discussed further in the discussion that follows.

The memory 320 of the computing device 302 stores the converter 332, similar to the converter 208 previously discussed with regard to the electronic writing instrument 200 shown in FIG. 2 and having the same function. However, if the converter 332 stored in the computing device 302 is utilized, the conversion of fingerprint data to the private key code 338 takes place on the computing device 302 instead of in the electronic writing instrument 200. This conversion may take place on the computing device 302 or in the fingerprint scanning writing instrument 304, depending on the desired implementation.

The electronic document 324 may initially comprise a paper document (not shown). If so, the paper document may be scanned with the scanner 306 to create the electronic document 324. After several processing steps, the electronic signature module 322 affixes the electronic signature 326 to the electronic document 324.

The converter 332 converts the fingerprint data 328 to derive the private key code 324. The key generator 336 encrypts the private key code 334 with the password 340 to create the public key code 338. It is noted, however, that any method known in the art for creating the public key code 338 from the private key code 334 may be utilized.

Figure 4:
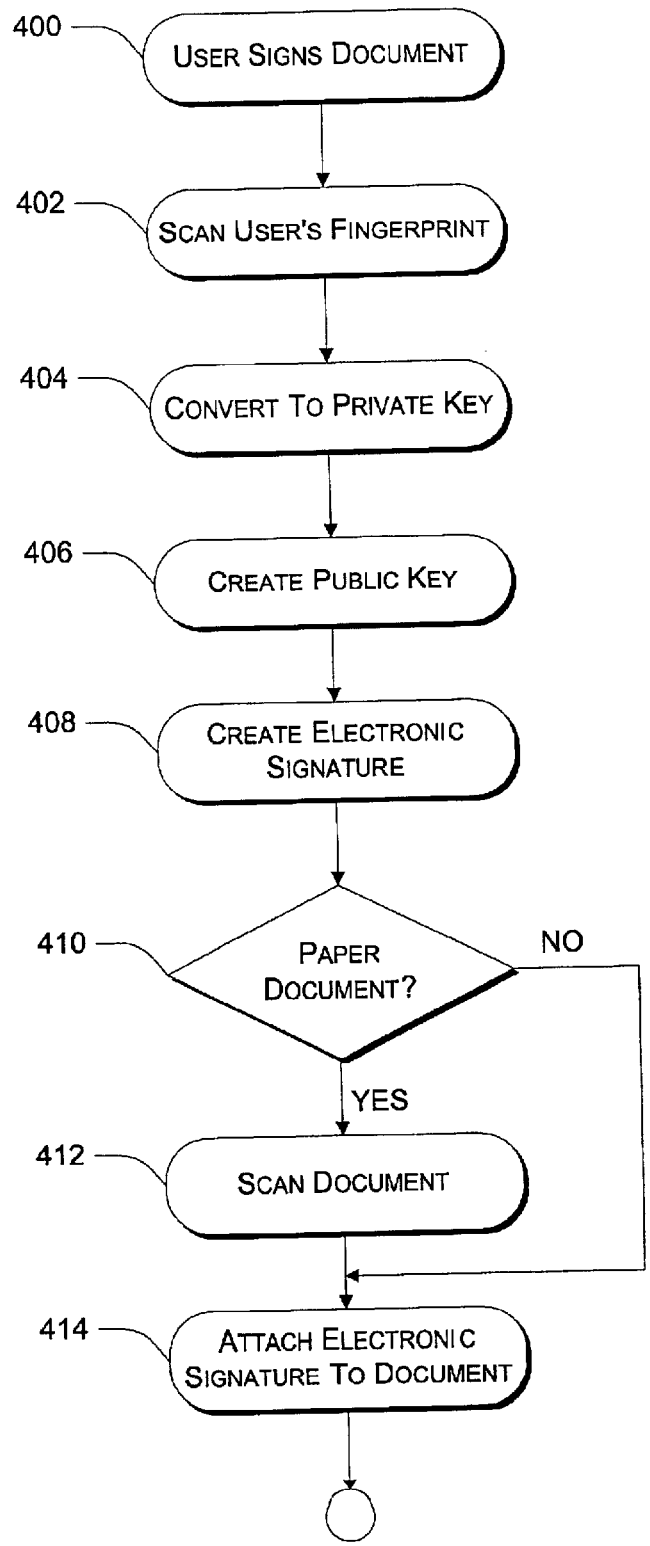
FIG. 4 is a flow diagram depicting a method for scanning a fingerprint to determine a private key code that is used to create an electronic signature.

Methodological Implementation of an Electronic Writing Instrument with a Fingerprint Scanner FIG. 4 is a flow diagram depicting a methodological implementation of an electronic writing instrument used to scan a fingerprint to determine a private key code that is used to create an electronic signature. For discussion purposes, continuing reference will be made to the elements and reference numerals included in FIGS. 2 and 3.

At block 400, a user signs a document with the fingerprint scanning writing instrument 304 in one of several ways. The user may sign a paper document that is subsequently scanned to create the electronic document 324. Alternatively, the user may sign a paper document that is positioned on top of an electronic pad. As the signature is written on the paper document, the electronic signature (a physical representation of the signature) is recorded by the electronic pad and stored in the computing device 302. Also, the user may sign a digital pad that creates and stores a physical representation of the signature in the computing device 302 without creating a signed paper document.

At about the same time as the user signs the document, the scanner 203 scans at least a portion of fingerprint of the user (block 402) that contacts the finger pad 202 on the electronic writing instrument 200. During the scanning process, the feature identifier 206 identifies several fingerprint features found on the user's fingerprint. Such features may include whorls, vortices, etc., that when taken together, uniquely identify the fingerprint as belonging to the user. As many fingerprint features that are necessary to uniquely identify the fingerprint as belonging to the user (e.g., 10 to 20) are identified. The fingerprint features are represented as fingerprint data.

At block 404, the converter 208 in the electronic writing instrument 200 or the converter 332 in the computing device 302 converts the fingerprint data 328 into the private key code 334. Whether this conversion occurs in the electronic writing instrument 200 or the computing device 302 depends on the specific implementation of the system. If the electronic writing instrument 200 transmits the fingerprint data 328 to the computing device 302 prior to converting the fingerprint data 328 into the private key 334 code, then the converter 332 in the computing device 302 performs the conversion. However, the conversion may be done by the converter 208 in the electronic writing device 200, in which case, the private key code 334 is transmitted from the electronic writing device 200 to the computing device 302, where it is stored in the memory 320.

The private key code 334 is used to create the public key code 338 at block 406. This may be done by any method known in the art to create a public key from a private key such that encryption by the private key can be verified by analyzing the public key. In this example, this is accomplished by encrypting the private key code 334 with a password 340 selected by the user.

At block 408, the electronic signature module 322 creates the electronic signature 326. The electronic signature 326 includes a number of bits from which the user's identity and the public key code 338 can be obtained. Various methods are known in the art for verifying the accuracy and authenticity of the electronic document 324 using these, and possibly other, pieces of information. Any of these methods may be used in the process described herein.

If the document 324 initially comprises a paper document ("Yes" branch, block 410), then the paper document is scanned at block 412 to create an electronic version of the document 324 that is stored in the memory 320 of the computing device 302. If the document 324 already exists as an electronic document ("No" branch, block 410), then the scanning step is not required.

At block 414, the electronic signature module 322 attaches the electronic signature 326 to the electronic document 324. This creates an electronically signed digital document 324 that may be transmitted to various parties online. A party receiving the signed document 324 can use the electronic signature 326 and the document 324 to verify that a sending party is who they claim to be. Also, the information is used to verify that the document 324 has not been altered since the electronic signature 326 was applied to the document 324.

CONCLUSION

Implementation of the systems and methods described herein provide a convenient way to uniquely identify a signer of an electronic or paper document and to create an electronic signature using the unique identification. In turn, attaching the electronic signature to the document provides a reliable method for verifying the accuracy and authenticity of the document.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An electronic writing instrument, comprising:
   a body;
   a nib located at an end of the body for applying writing strokes on a surface;
   a finger pad on the length of the body on which a fingerprint of a user's finger rests when the user is holding the writing instrument in a writing position;
   a fingerprint scanner configured to scan the user's fingerprint when the user's finger is resting on the finger pad;
   a feature identifier in communication with the fingerprint scanner and configured to identify a plurality of fingerprint features of the user's fingerprint scanned by the fingerprint scanner; and
   a converter in communication with the feature identifier and configured to convert fingerprint features identified by the fingerprint scanner into a private key code.

2. The electronic writing instrument as recited in claim 1, further comprising a ball point pen cartridge, and wherein the nib further comprises a ball on an end of the ball point pen cartridge.

3. The electronic writing instrument as recited in claim 1, wherein the converter is configured to convert fingerprint features identified by the fingerprint scanner into a private key code, wherein the private key code includes at least one digit for each feature identified by the feature identifier, each digit having a value representing a degree of the fingerprint feature associated with that digit.

4. The electronic writing instrument as recited in claim 1, further comprising an output port configured to output data from the writing instrument to a computing device.

5. The electronic writing instrument as recited in claim 1, further comprising a wireless transmitter configured to transmit data from the writing instrument to a wireless receiver located remote from the writing instrument.

6. The electronic writing instrument as recited in claim 1, wherein the converter is configured to convert fingerprint features identified by the fingerprint scanner into a private key code that can be used to create a public key code that uniquely identifies the user by identifying the fingerprint features.

7. The electronic writing instrument as recited in claim 1, wherein the converter is configured to convert fingerprint features identified by the fingerprint scanner into a private key code, wherein the private key code is used to create at least a part of en electronic signature.

8. A method, comprising:
   scanning a fingerprint to obtain fingerprint data related to fingerprint features;
   transforming the fingerprint data into a private key code; and
   creating a public key code from the private key code.

9. The method as recited in claim 8, further comprising incorporating the public key code into an electronic signature.

10. The method as recited in claim 8, wherein the scanning a fingerprint further comprises scanning a fingerprint of a person who is using an electronic writing instrument while the person is using the electronic writing instrument.

11. A method, comprising:
    receiving fingerprint data;
    transforming the fingerprint data into a private key code uniquely identifying the fingerprint;
    deriving a public key code from the private key code; and
    incorporating the public key code into an electronic signature.

12. The method as recited in claim 11, wherein the receiving fingerprint data further comprises scanning a fingerprint from an electronic writing instrument to obtain the fingerprint data.

13. The method as recited in claim 11, further comprising affixing the electronic signature to an electronic document.

14. The method as recited in claim 13, wherein the affixing the electronic signature to an electronic document further comprises scanning a document to create a corresponding electronic document and affixing the electronic signature to the corresponding electronic document.

15. One or more computer-readable media containing computer-executable instructions that, when executed on a computer, perform the following steps:
    scanning a fingerprint of a writing instrument user to obtain fingerprint data that uniquely identifies the fingerprint;
    identifying a plurality of fingerprint features of the user's scanned fingerprint; and
    converting the identified fingerprint features into a private key code.

16. The one or more computer-readable media as recited in claim 15, containing further computer-executable instructions that, when executed on a computer, transmit the private key code to a computing device that uses the private key code to create an electronic signature.

17. The one or more computer-readable media as recited in claim 16, wherein the transmitting further comprises transmitting the fingerprint data to the computing device over a wireless link.

18. One or more computer-readable media containing computer-executable instructions that, when executed on a computer, perform the following steps:
    receiving fingerprint data from an electronic writing instrument;
    creating a public key code using the fingerprint data; and
    creating an electronic signature using the public key code.

19. The one or more computer-readable media as recited in claim 18, wherein the fingerprint data further comprises fingerprint data that uniquely identifies fingerprint features included in the fingerprint.

20. The one or more computer-readable media as recited in claim 19, containing further computer-executable instructions that, when executed on a computer, converts the fingerprint data into a public key code that can be uniquely mapped to the fingerprint related to the fingerprint data.

21. The one or more computer-readable media as recited in claim 18, wherein the fingerprint data further comprises a private key code derived from the fingerprint data.

22. The one or more computer-readable media as recited in claim 18, wherein the creating an electronic signature further comprises directly incorporating the fingerprint data into the electronic signature.

23. The one or more computer-readable media as recited in claim 18, wherein the creating an electronic signature further comprises:
    converting the fingerprint data into a private key code; and
    incorporating the private key code into the electronic signature.

24. The one or more computer-readable media as recited in claim 18, wherein the creating an electronic signature further comprises:

converting the fingerprint data into a private key code;

creating a public key code from the private key code; and incorporating the public key code into the electronic signature.

25. The method of claim 8, wherein transforming comprises transforming the fingerprint data into a private key code, wherein the private key code includes at least one digit for each feature identified by the feature identifier, each digit having a value representing a degree of the fingerprint feature associated with that digit.

26. The method of claim 11, wherein transforming comprises transforming the fingerprint data into a private key code, wherein the private key code includes at least one digit for each feature identified by the feature identifier, each digit having a value representing a degree of the fingerprint feature associated with that digit.

27. The one or more computer readable media as recited in claim 15, wherein the converting of the identified fingerprint features into a private key code comprises converting the identified fingerprint features into a private key code, wherein the private, key code includes at least one digit for each feature identified by the feature identifier, each digit having a value representing a degree of the fingerprint feature associated with that digit.

28. The one or more computer readable media as recited in claim 21, wherein the private key code includes at least one digit for each feature identified by the feature identifier, each digit having a value representing a degree of the fingerprint feature associated with that digit.

29. An electronic writing instrument, comprising:

a body;

a nib located at an end of the body for applying writing strokes on a surface;

a finger pad on the length of the body on which a fingerprint of a user's finger rests when the user is holding the writing instrument in a writing position;

a means for scanning the user's fingerprint when the user's finger is resting on the finger pad;

a means for identifying a plurality of fingerprint features of the user's fingerprint scanned by the means for scanning; and a means for converting fingerprint features identified by the means for identifying into a private key code.

* * * * *